US007691217B2

(12) United States Patent
Misani et al.

(10) Patent No.: US 7,691,217 B2
(45) Date of Patent: Apr. 6, 2010

(54) PROCESS FOR MANUFACTURING A TYRE AND TOROIDAL SUPPORT FOR CARRYING OUT THE PROCESS

(75) Inventors: Pierangelo Misani, Monza (IT); Guido Riva, Milan (IT); Cèline Almonacil, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 750 days.

(21) Appl. No.: 10/515,832

(22) PCT Filed: May 31, 2002

(86) PCT No.: PCT/EP02/06012
§ 371 (c)(1),
(2), (4) Date: Jul. 1, 2005

(87) PCT Pub. No.: WO03/101711
PCT Pub. Date: Dec. 11, 2003

(65) Prior Publication Data
US 2005/0247393 A1 Nov. 10, 2005

(51) Int. Cl.
*B29D 30/12* (2006.01)
*B29C 33/02* (2006.01)

(52) U.S. Cl. .................. 156/130.5; 156/133; 156/273.3; 156/379.6; 156/414; 156/421.6; 264/326; 425/41; 425/50

(58) Field of Classification Search ............... 156/130.5, 156/123, 273.3, 273.5, 414, 421.6, 275.5, 156/379.6, 417–420; 425/41, 40, 42, 50
See application file for complete search history.

(56) References Cited

U.S. PATENT DOCUMENTS

| | | | | |
|---|---|---|---|---|
| 1,984,909 A | * | 12/1934 | Woock | 219/528 |
| 2,411,558 A | * | 11/1946 | Semler | 425/14 |
| 2,451,992 A | | 10/1948 | Te Grotenhuis | |
| 2,586,526 A | * | 2/1952 | Enabnit | 425/50 |
| 2,822,576 A | * | 2/1958 | Rowe, Jr. | 425/41 |
| 2,929,909 A | * | 3/1960 | Gibbs | 219/523 |
| 2,938,100 A | | 5/1960 | Gibbs | |
| 6,069,346 A | * | 5/2000 | Hyllberg | 219/469 |

(Continued)

FOREIGN PATENT DOCUMENTS

DE 3308820 A1 * 9/1984 ................. 425/41

(Continued)

*Primary Examiner*—Geoffrey L Knable
(74) *Attorney, Agent, or Firm*—Finnegan, Henderson, Farabow, Garrett & Dunner, L.L.P.

(57) ABSTRACT

A process for manufacturing a tire includes providing an elastomeric layer on an outer surface of a toroidal support, manufacturing the tire on the toroidal support provided with the elastomeric layer, introducing the tire supported on the toroidal support into a moulding cavity, introducing a fluid under pressure into a space defined between the toroidal support and an inner surface of the tire in order to press an outer surface of the tire against walls of the moulding cavity, and curing the tire. The elastomeric layer forms an inner circumferential surface of the tire. The process further includes causing an electrical current to flow in at least one heating element provided to the outer surface of the toroidal support so as to obtain at least partial precuring of the elastomeric layer. A toroidal support for carrying out the process is also disclosed.

34 Claims, 7 Drawing Sheets

U.S. PATENT DOCUMENTS

| | | | |
|---|---|---|---|
| 6,203,641 B1 * | 3/2001 | Laurent et al. | 156/130.5 |
| 6,350,402 B1 * | 2/2002 | Kobayashi | 264/326 |
| 6,468,062 B1 * | 10/2002 | Soulalioux et al. | 425/50 |

FOREIGN PATENT DOCUMENTS

| | | | |
|---|---|---|---|
| EP | 0 928 680 A1 | | 7/1999 |
| EP | 0 976 533 A2 | | 2/2000 |
| EP | 0 976 534 A2 | | 2/2000 |
| EP | 0 976 534 A3 | | 2/2000 |
| EP | 1 075 929 A1 | | 2/2001 |
| GB | 2200085 A | * | 7/1988 |
| JP | 11-320567 | | 11/1999 |

* cited by examiner

PROCESS FOR MANUFACTURING A TYRE AND TOROIDAL SUPPORT FOR CARRYING OUT THE PROCESS

CROSS-REFERENCE TO RELATED APPLICATIONS

The application is a national-phase entry under 35 U.S.C. §371 from International Application No. PCT/EP02/06012, filed May 31, 2002, at the European Patent Office, the content of which is relied upon and incorporated herein by reference.

BACKGROUND OF THE INVENTION

1. Field of the Invention

The present invention relates to a process for manufacturing a tyre. In particular, the present invention relates to a process for manufacturing a tyre comprising the steps of producing and assembling the tyre structural elements on a toroidal support and precuring the inner surface of the green tyre by heating the outer surface of said toroidal support.

Furthermore, the present invention relates to a toroidal support to be used in a process for manufacturing a tyre, the outer surface of said toroidal support being heated during the precuring step of said manufacturing process.

2. Description of the Related Art

In the present description, the term "green tyre" is used to indicate the product which is obtained upon assembling tyre structural elements which include an elastomeric material in an uncured state.

Furthermore, in the present description the term "elastomeric material" is used to indicate a composition comprising at least one elastomeric polymer and at least one reinforcing filler. Said composition preferably also includes additives such as crosslinking agents and/or plasticizers.

Moreover, in the present description, the term "sinner surface" of the tyre is used to indicate the innermost surface of the tyre which, when the tyre is cured and operatively mounted on a wheel rim, comes into contact with the inflating fluid of the tyre.

The manufacturing process according to the present invention comprises the step of manufacturing a green tyre by consecutively producing and assembling together on a toroidal support the tyre structural elements, as described, for instance, in the European Patent Application N° 928,680 in the name of the same Applicant.

The manufacturing process further comprises the successive steps of moulding the green tyre, so as to confer to the latter a desired tread pattern, and of curing the green tyre, so as to confer to the latter a desired geometrical conformation which is obtained by curing the elastomer material forming the tyre itself.

The moulding and curing steps of the green tyre are carried out by introducing the green tyre into a moulding cavity defined within a vulcanization mould, whose shape matches the shape of the outer surface of the tyre to be obtained, and by admitting a fluid under pressure into a diffusion interspace created between the inner surface of said green tyre and said toroidal support.

Such a manufacturing process is described, for instance, in the European Patent Application N° 976,533 in the name of the same Applicant, according to which, during the pressing of the raw elastomer material against the walls of the moulding cavity, a radial expansion is imposed to the tyre by effect of the pressurized-fluid admission. The pressurized-fluid admission is preferably carried out by means of feeding channels formed in the toroidal support and terminating at the outer surface of the latter. During the pressurized-fluid admission, the tyre is sealingly engaged at its circumferential inner edges, between the walls of the moulding cavity and the outer surface of the toroidal support, so as to delimit the diffusion interspace at the circumferential inner edges of the tyre itself. Advantageously, the heat amount which is necessary for curing the green tyre is provided to the latter through the walls of the moulding cavity and by means of a heating fluid which is introduced into the diffusion interspace. Preferably said heating fluid is the fluid under pressure used for carrying out the pressing step or is at least part of said fluid under pressure.

Therefore, in accordance with such a process, the manufacturing of a tyre is carried out in the absence of a vulcanization bladder which is commonly employed in conventional processes. The bladder is generally made of rubber and is inflated with steam and/or a high-pressure heated fluid and inserted into the green tyre, enclosed in the moulding cavity, in order to conveniently press the tyre against the walls of the moulding cavity and to provide the tyre with the desired geometric conformation as a result of the cross-linking process to which the elastomer material forming the tyre itself is submitted.

However, in processes without a vulcanization bladder as described above, the fluid under pressure directly comes into contact with the inner surface of the green tyre causing a plurality of inconveniences due to permeation of the fluid itself into the structure of the tyre not yet, vulcanized. For instance, separations between adjacent elastomeric layers or between the elastomeric material and the metallic or textile reinforcing structures may occur, or even corrosion phenomena in the metallic reinforcing materials may be unadvantageously promoted.

In order to avoid the inconveniences mentioned above, European Patent Application N° 976,534, in the name of the Applicant, describes a tyre manufacturing process comprising the step of associating at least one layer of precured elastomeric material with the inner surface of the green tyre for preventing the permeation of the fluid under pressure into the inside of the green tyre itself. Said precured layer is suitable for obtaining a sufficient mechanical strength to diffusion and penetration of the fluid under pressure and, at the same time, a high fatigue strength, in particular during the moulding step of the tyre in order to avoid formation of fissures and cracks. Therefore, according to said European Patent Application the manufacturing process comprises the steps of forming at least one layer of raw elastomeric material on the outer surface of the toroidal support, so that the successive manufacturing of the green tyre is carried out on the toroidal support carrying said layer of raw elastomeric material, and of precuring said layer before introducing the green tyre into the vulcanization mould. Said precuring step is carried out by supplying heat to said layer through the toroidal support. Preferably, heating of the toroidal support is achieved thanks to the fact that the toroidal support comes from a previous moulding and vulcanization cycle or by means of infrared rays or equivalent means, such as electric resistors arranged in the toroidal support itself.

European Patent Application N° 1,075,929 discloses a process for manufacturing a tyre according to which a rigid toroidal support is used as support on which the green tyre is manufactured and as moulding means for moulding the radial inner surface of the tyre. Said European Patent Application is focused to the problem of providing a toroidal support which is mechanically resistant, without compromising the easiness of assembling/disassembling the different parts of said support, good heat conductor, in order to supply heat to the green tyre for the curing thereof, and suitably light to be easily transferred along the production plant. According to said document, the toroidal support consists of a plurality of sectors, each sector being formed by two distinct portions: a principal portion, whose radially outer surface region forms the inner circumferential surface of the tyre, and a coupling portion, positioned radially internal to said principal portion and integral thereto, which is associated to a coupling device that assembles together the plurality of sectors to form the toroidal support. Furthermore, according to said document the principal part of each sector is moulded in a thermally conductive material (e.g., an aluminum alloy) and incorporates an electrical resistance for providing heat to the green tyre during the curing step. In a further embodiment, said electrical resistance can be placed in a bored housing within said principal part or can be fixed to the radially internal surface of said principal part.

Document JP 11-320,567 discloses a toroidal support on which a green tyre is manufactured, each sector of said support being contacted, in correspondence of the inner circumferential surface thereof, with a circular segment provided with resistor heaters so that a heat amount is supplied to the outer circumferential surface of the toroidal support from the inner circumferential surface thereof for curing the green tyre. The plurality of circular segments is arranged along the through hole of a cam of the toroidal support so that the circular segments, and thus the respective resistor heaters, are placed in the working position and can be retracted at the end of the curing step.

In a process for manufacturing a tyre wherein the green tyre is assembled on a toroidal support and the curing step is carried out in the absence of a vulcanization bladder, a plurality of drawbacks occurs due to the fluid under pressure contacting the inner surface of the green tyre.

The technical solution disclosed in European Patent Application N° 976,534, i.e. precuring the layer of raw elastomeric material forming the inner circumferential surface of the tyre, advantageously avoids the occurring of said drawbacks. Furthermore, precuring said elastomeric layer, commonly referred to as "liner", i.e. the elastomeric layer which is suitable for ensuring the retention of the tyre inflating fluid, is particularly advantageous also during the conformation of the tyre since the precured liner is provided with high mechanical resistance. On the contrary, in the case an uncured elastomeric layer is present, the mechanical resistance thereof is not substantially the same in each point of said layer so that, during the admission of fluid under pressure, the surface of said layer can react differently from point to point and a uniform conformation of the tyre is prevented. Said aspect is particularly true in the case the uncured elastomeric layer is obtained by assembling together a plurality of elastomeric strips as described, for instance, in European Patent Application N° 928,680. Moreover, since the fluid under pressure exiting from the feeding channels provided within the toroidal support does not uniformly impact onto the liner surface, in the case the latter is uncured said fluid creates the formation of disuniformities on the inner circumferential surface of the tyre as well as of areas of different colours, facts which cause the tyre not to be accepted from an aesthetic point of view. According to European Patent Application N° 976,534, the precuring of the inner circumferential surface of a green tyre is carried out by supplying heat thereto through a toroidal support which is heated in all its constitutive parts thanks to its use in a previous moulding and vulcanization cycle or by means of infrared rays or any equivalent means, such as electric resistors.

According to European Patent Application N° 1,075,929 the whole body of the toroidal support is heated and the latter is used as a heat diffuser. In order to achieve such a result, the principal part of each sector of the toroidal support is provided with an electrical resistance incorporated within said principal part, which is made of thermally conductive material, so that a heat amount is supplied to the green tyre during vulcanization through the toroidal support. According to said document the electric resistance causes the heating of the principal part of each sector as well as of the anchoring part of each sector, which is integral with said principal part, so that the whole body of the toroidal support is heated.

Furthermore, document JP 11-320,567 discloses a technical solution according to which the whole body of the toroidal support is heated.

Therefore, all the technical solutions described in the prior art documents cited above are directed to a complete heating of the whole body of the toroidal support in order to transmit a heat amount to a green tyre's structural component.

SUMMARY OF THE INVENTION

The Applicant has perceived that, in order to precure the inner circumferential surface of a green tyre, it is not necessary to heat the whole body of the toroidal support. The Applicant, in fact, has noted that heating the whole body of the toroidal support is energy and time consuming, and decreases the average life of the toroidal support material which is subjected to thermal fatigue damages.

Therefore, the Applicant has found that, in order to carry out said precuring step, a local heating of the outer surface of the toroidal support can be performed.

In other words, the Applicant has found that the toroidal support can be provided with at least a heating element which is able to transmit a suitable heat amount to the inner circumferential surface of the green tyre to be precured and to ensure that no substantial heat amount is transmitted inwardly the toroidal support, i.e. far from said inner circumferential surface of the green tyre to be precured.

To achieve such a result, the Applicant has found that the toroidal support can be provided with a heating element which comprises, in a radial direction from the inside towards the outside of said heating element, a thermally insulating layer and an electrically resistive circuit so that a major amount of the heat produced by said circuit, when a current is made to flow therein, is transmitted to the elastomeric layer to be precured. In fact, the presence of said thermally insulating layer limits the heat produced by said circuit to be dissipated inside of the toroidal support.

Furthermore, the Applicant has found that a heating element comprising at least one thermally insulating layer and an electrically resistive circuit allows a uniform heating of the toroidal support outer surface so that the precuring of the inner elastomeric layer of a tyre is homogeneously performed.

In a first aspect the present invention relates to a process for manufacturing a tyre comprising the steps of:
providing an elastomeric layer on an outer surface of a toroidal support having a shape substantially matching the shape of the inner surface of said tyre, said elastomeric layer forming the inner circumferential surface of a green tyre;
manufacturing said green tyre on said toroidal support provided with said elastomeric layer;
introducing said green tyre supported on said toroidal support into a moulding cavity having walls the shape of which matches the shape of an outer surface of the tyre;
introducing a fluid under pressure into the space defined between the inner surface of said green tyre and said toroidal support in order to press the outer surface of said green tyre against the walls of said moulding cavity, and curing said green tyre, wherein said process further comprises the step of causing an electrical current to flow in at least a heating element provided to the outer surface of said toroidal support so as to obtain an at least partial precuring of said elastomeric layer.

According to a preferred embodiment, the step of causing an electrical current to flow in at least one heating element provided to the outer surface of said toroidal support is carried out before the step of introducing the fluid under pressure.

The Applicant has noted that locally heating the outer surface of the toroidal support is particularly advantageous in terms of: a) energy saving, since only a limited portion of the toroidal support is heated; b) increased average life of the toroidal support material, since the latter is not subjected to thermal fatigue damages, and c) time saving, since the desired precuring temperature can be quickly reached due to the limited area of the toroidal support to be heated. Furthermore, in the recent tyre manufacturing processes, according to which a tyre is formed directly on a toroidal support by overlaying axially adjacent and/or radially superimposed turns of at least a semi-finished elementary product of appropriate dimensions wound onto said support, the precuring step of the inner circumferential surface of a green tyre has to be carried out in a time compatible with the manufacturing time of the tyre.

Moreover, according to the present invention the toroidal support is effectively heated so that the external surface thereof quickly reaches the desired temperature and said temperature is as uniformly distributed as possible on said external surface.

According to a first embodiment, the heating of the toroidal support is carried out when the elastomeric layer is completed and supported on the outer surface of said support. Said elastomeric layer can be provided to the toroidal support in the form of a sheet, in accordance with conventional tyre manufacturing techniques wherein each elastomeric component is extruded in its final shape and stored ready to be used on the manufacturing machines, or in the form of a profiled strip of elastomeric material, in accordance with more recent tyre manufacturing processes, as for example shown in European patent application EP-928,680.

According to a further embodiment of the present invention, the heating of the toroidal support is carried out at the end of the step of manufacturing the green tyre on the toroidal support. In other words, according to said embodiment, the tyre manufacturing process comprises the step of producing the green tyre by forming and/or assembling together the tyre structural elements and subsequently precuring the inner circumferential surface of the tyre before introducing the latter into the moulding cavity within which moulding and curing are performed. An example of a tyre manufacturing process is described in the abovementioned European Patent Application EP-928,680 according to which a limited number of semi-finished elementary products are fed onto a toroidal support which is conveyed, preferably by a robotized system, between a plurality of stations, at each of which a predetermined tyre-manufacturing step is carried out in automated sequences. By overlaying said semi-finished elementary products on said toroidal support in adjacent turns, the entire structure of the green tyre can be obtained.

According to a further embodiment of the present invention, the heating of the toroidal support is carried out before the step of providing the elastomeric layer on the outer surface of the toroidal support. In other words, at the beginning of a manufacturing cycle of a tyre, the toroidal support is suitably heated to a predetermined temperature by means of the heating element according to the present invention and subsequently an elastomeric layer (e.g. the liner) is provided to the outer surface of the toroidal support. In such a way the precuring of said elastomeric layer starts during the deposition thereof on the heated toroidal support. Furthermore, according to said further embodiment, by preheating the toroidal support before manufacturing the tyre any moisture, possibly present on the support outer surface and due, for example, to a previous tyre manufacturing cycle, can be avoided.

According to a further embodiment of the present invention, the heating of the toroidal support is carried out also during the curing step in addition to the beat which is provided by the vulcanization fluid and by the walls of the moulding cavity. In fact generally, since the tyre to be vulcanized is positioned inside of the moulding cavity with its sidewalls substantially parallel to the base of the vulcanizer, the condensate that forms during the curing step accumulates in correspondence of the lower sidewall of the tyre so that said lower sidewall reaches a temperature, and thus a curing degree, lower than that of the upper sidewall. In order to avoid such a drawback, according to the present invention a locally heat distribution of the toroidal support can be carried out so that the lower sidewall can be heated more that the upper one.

According to a further embodiment of the present invention, at least a portion of the outer surface of the toroidal support is selectively heated.

In a further aspect the present invention relates to a toroidal support for manufacturing a green tyre thereupon, said support comprising a plurality of circumferential segments defining the outer surface of said toroidal support, said outer surface having a shape which substantially matches the shape of the inner surface of said green tyre, wherein said toroidal support further comprises at least a heating element covering at least a portion of the outer surface of said toroidal support, said heating element comprising, in a radial direction from the inside towards the outside of said heating element, a thermally insulating layer and an electrically resistive circuit.

According to a preferred embodiment of the present invention, the heating element further comprises a protective layer positioned radially external to the electrically resistive circuit. Said protective layer, which comes into contact with the elastomeric material to be precured, is made of electrically insulating material. First of all said protective layer has the function of preventing the technical staff operating on the toroidal support from inadvertently touching the electrically resistive circuit. Furthermore, said protective layer is requested to be sufficiently tacky to allow a correct manufacturing of the tyre structural elements thereupon as well as to be provided with sufficient anti-sticking properties so that said elastomeric material is easily detachable from the toroidal support.

According to a preferred embodiment, the toroidal support comprises a plurality of circumferential segments defining the outer surface of the toroidal support, each circumferential segment being provided with a heating element.

Alternatively, a number of circumferential segments are provided with a heating element, while the remaining circumferential segments are devoid of a heating element so that a locally distributed heating can be performed.

According to a further embodiment, each circumferential segment is obtained by assembling together at least two distinct elements. For instance, one element can correspond to the tyre sidewall and another one can correspond to the tread band or a portion thereof. Therefore, according to said embodiment, some of the elements forming each circumferential segment are provided with the heating element so that specific portions of the tyre can be selectively heated.

According to a further embodiment, the plurality of circumferential segments is provided with a heating element, but only few of them are selectively heated. In other words, by making the electrical current to flow within selected electrically resistive circuits of the heating elements, predetermined circumferential segments are caused to heat so that a locally distributed heating of the outer surface of the toroidal support can be performed.

According to a further embodiment of the present invention, at least a number of the circumferential segments of the toroidal support is provided with a heating element having at least two electircally resistive circuits. In other words, according to said embodiment each circumferential segment is divided into at least two distinct portions each provided with an electrically resistive circuit connected to a current generator. In such a way it is possible to make the electrical current flowing into at least one of said electrically resistive circuits so that each circumferential segment can be provided with differently heated portions thereof and a locally distributed heating of the outer surface of the toroidal support can be performed.

According to a further embodiment, the circumferential segments of a toroidal support are provided with electrically resistive circuits having different geometrical configuration so that a locally distributed heating of the outer surface of the toroidal support can be performed. For example, said circumferential segments can be provided with electrically resistive circuits having different longitudinal development as well as different density or width of the heating branches of said circuit.

According to a further embodiment, in order to obtain a locally distributed heating of the outer surface of the toroidal support, in the case each circumferential segment is provided with at least two distinct electrically resistive circuits, the latter present the same density of the heating branches but a different electrical current intensity is caused to flow within said at least two distinct electrically resistive circuits.

According to a further embodiment, in order to obtain a locally distributed heating of the outer surface of the toroidal support, the electrically resistive circuit presents a variation of the density of the heating branches so that the same electrical current intensity creates two zones of the circumferential segment which are differently heated.

According to a further embodiment, in order to obtain a locally distributed heating of the outer surface of the toroidal support, in the case each circumferential segment is provided with at least two distinct electrically resistive circuits, the latter present a different density of the heating branches but the same electrical current intensity is caused to flow within said at least two distinct electrically resistive circuits.

Furthermore, suitable electrical current conditions can be selected such as, for instance, direct current, alternate current, pulsanting current, waveform current (e.g. square wave).

Furthermore, the electrical current intensity can be advantageously controlled and, if necessary, modified by a rectifier (controller) which acts on the current generator in the case said electrical current intensity deviates from a set value or from a predetermined curve of said electrical current intensity.

BRIEF DESCRIPTION OF THE DRAWINGS

Further characteristics and advantages of the present invention will be illustrated by the following description of some preferred embodiments.

The following description makes reference to the accompanying drawings, in which.

DETAILED DESCRIPTION OF THE EXEMPLARY EMBODIMENTS

A tyre usually comprises a carcass structure having at least one carcass ply of toroidal shape, associated by its circumferential edges to a pair of annular reinforcing structures or "bead cores", each reinforcing structure being positioned in the finished tyre in an area usually known as the "bead" which ensures the fitting of the tyre into the respective fitting rim. In a position radially external to the abovementioned carcass ply is provided a belt structure, comprising one or more belt strips laid on top of each other, and a tread band is laid radially external to the abovementioned belt structure. In the vulcanized tyre said tread band it provided with a suitable tread pattern moulded into it during the vulcanizing process. Furthermore, two side walls are laterally placed on opposite sides of the abovementioned carcass structure. The carcass structure is preferably covered radially on the inside by a layer of elastomeric material known as the "liner" to ensure that the tyre is airtight under running conditions.

Figure 1:
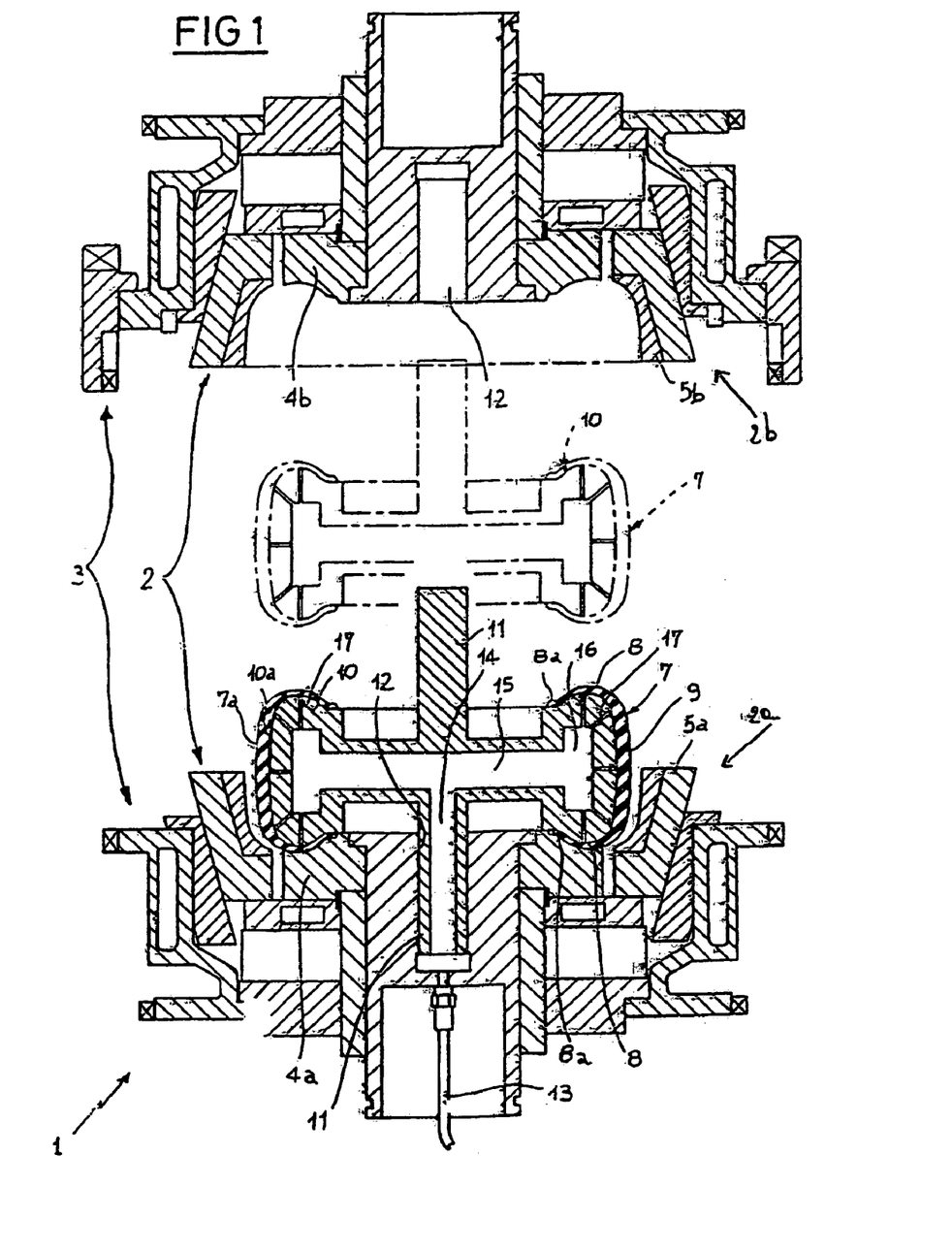
FIG. 1 schematically shows a diametrical section of an apparatus for manufacturing a tyre in accordance with the invention during the step of loading a tyre into a mould shown in an open condition.

With reference to FIG. 1, an apparatus for manufacturing a tyre is generally identified by reference sign 1.

Apparatus 1 comprises a vulcanization mould 2 associated with a vulcanization press 3, only diagrammatically shown in that it can be made in any convenient manner as conceived by a person skilled in the art. The vulcanization mould 2 is provided with lower 2a and upper 2b mould halves that are movable relative to each other between an open condition (in which they are mutually spaced apart as shown in FIG. 1) and a closed position (in which they are disposed mutually close to each other for the purpose of forming a moulding cavity). The lower 2a and upper 2b mould halves are provided with lower 4a and upper 4b cheeks respectively, and a crown of lower 5a and upper 5b sectors in order to reproduce the geometric conformation of the outer surface 7a of a tyre 7 to be obtained. In more detail, cheeks 4a, 4b are intended for forming the outer surfaces of the opposite sidewalls 8 of tyre 7, whereas sectors 5a, 5b are intended for forming the so-called tread band 9 of the tyre itself, creating a series of cuts and longitudinal and/or transverse grooves therein, suitably disposed according to a desired "tread patterns".

Apparatus 1 is further provided with at least one toroidal support 10 having an outer surface substantially reproducing the shape of an inner surface of tyre 7. The toroidal support 10 is conveniently made up of a collapsible drum comprising centripetally movable circumferential segments for dismantling the toroidal support itself and enabling easy removal of the same from tyre 7, at the end of the manufacturing process. A green tyre is disposed on the toroidal support 10 before the latter is fitted, together with the tyre itself, into the vulcanization mould 2 arranged in an open condition. In particular, engagement of tyre 7 on the toroidal support 10 can be conveniently obtained by directly manufacturing the tyre on the support itself. In this way the toroidal support 10 is advantageously utilized as a rigid outline for forming and/or deposition of the different structural elements, such as carcass plies, bead-reinforcing structures, belt strips, sidewalls, and tread band for example, which structural elements cooperate in forming the tyre itself.

The toroidal support 10 is preferably provided with at least one centering shank 11 to be engaged in a centering seat 12 arranged in mould 2, for establishing a precise positioning of the toroidal support itself and the tyre 7 carried thereon, within the moulding cavity. In the embodiment shown in FIG. 1, two centering shanks 11 are provided to the toroidal support 10 extending from opposite sides thereof.

At the moment that mould 2 is closed, the walls of the moulding cavity remain at a certain distance from the outer surface of tyre 7, in particular at the tread band 9 of the latter. During this step, the tread band 9 can in any case be partly penetrated by the raised portions arranged on sectors 5a, 5b so as to define said tread pattern. Furthermore, at the moment that mould 2 is closed, each of the inner circumferential edges 8a of tyre 7 is sealingly engaged between the inner circumferential portions of the toroidal support 10 and inner circumferential portions of the lower 4a and upper 4b cheeks. Tyre 7 will remain sealingly engaged in the mould in the above described manner until the moment that, at the end of the moulding and curing cycle, the mould itself will be brought again to its open condition. When mould closure has been completed, tyre 7 is submitted to a pressing step with its outer surface 7a against the walls of the moulding cavity, concurrently with supplying of heat, so as to cause molecular cross-linking of the elastomer material forming the tyre itself and consequent geometric and structural stabilization of the latter. For this purpose, apparatus 1 is provided with pressing means comprising at least one primary duct 13 opening into one of the centering seats 12 for sending a fluid under pressure to at least one connecting duct 14 formed along at least one of the centering shanks 11, preferably coaxially therewith. The connecting duct 14 terminates, for example through appropriate branches 15 radially formed in the toroidal support 10, at an annular chamber 16 provided internally of the toroidal support itself. Extending from the annular chamber 16, through the toroidal support 10, is a plurality of channels 17 for feeding said fluid under pressure, which open into the outer surface 10a of the toroidal support itself and are suitably distributed over the circumferential extension of said support. The pressurized fluid fed from the primary duct 13 reaches the feeding channels 17 via the connecting duct 14, the radial branches 15 and the annular chamber 16, then opening onto the outer surface 10a of the toroidal support 10. The pressurized fluid is thus admitted to a diffusion interspace created between the outer surface 10a of the toroidal support 10 and the inner surface 7b of tyre 7, said diffusion interspace is directly created following an expansion of tyre 7 caused by effect of the thrust exerted by the pressurized fluid.

Figure 2:
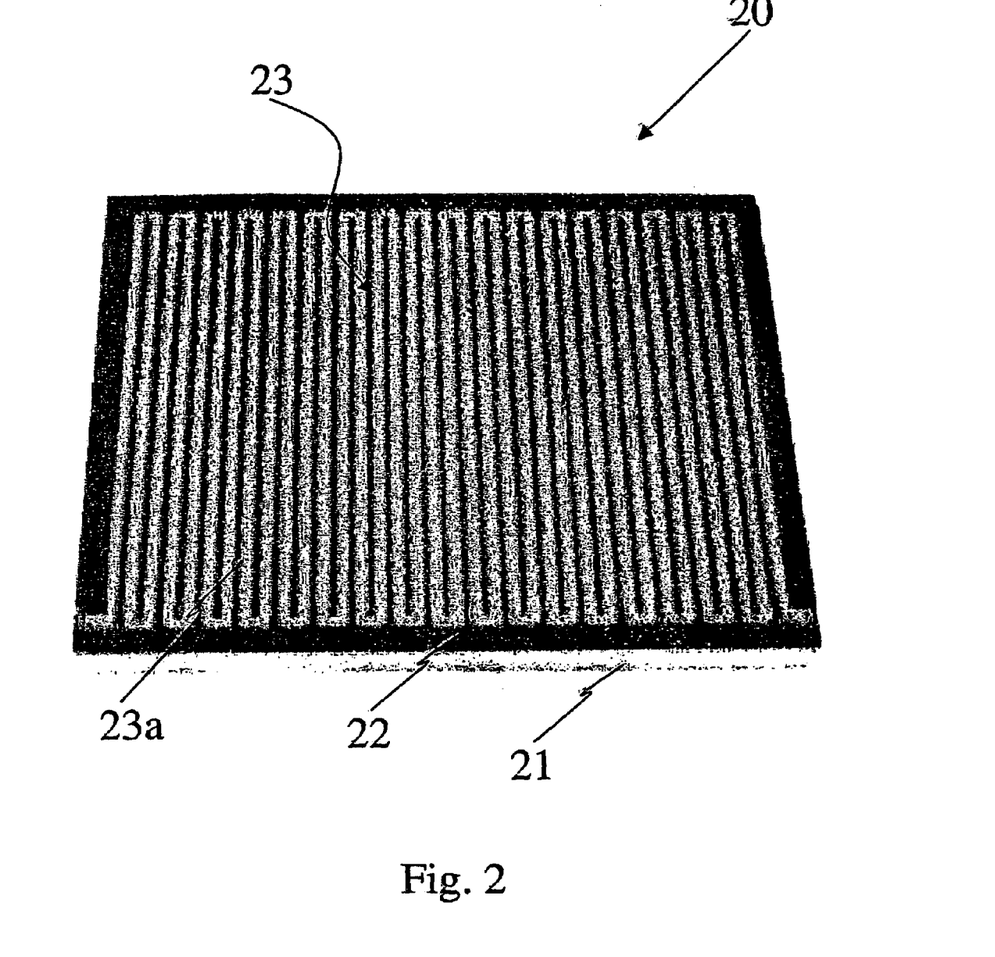
FIG. 2 shows a perspective view of a heating element associated to a metallic substrate in the form of a plate according to an embodiment of the present invention.

With reference to FIG. 2, a heating element 20 is shown associated to a metallic substrate 21 in the form of a plate. According to the embodiment shown in FIG. 2, heating element 20 comprises a thermally insulating layer 22, covering the outer surface of the metallic substrate 21, and an electrically resistive circuit 23 associated to said thermally insulating layer 22.

FIG. 2 shows a plurality of heating branches 23a forming said electrically resistive circuit 23 which are flown by an electric current fed by a current generator (not shown).

According to the embodiment of FIG. 2, the greatest part of the surface area of the metallic substrate 21 is covered by said heating branches 23a so that a fast and uniform distribution of the heat produced by the flowing of the electric current within the electrically resistive circuit 23 can be obtained on the outer surface of said substrate 21. Therefore, the embodiment of FIG. 2 shows an electrically resistive circuit 23 having a very high density of heating branches 23a. Nevertheless, heating elements 20 (not shown) provided with a density of the heating branches 23a lower than that of FIG. 2 can be provided if needed, as well as heating elements 20 (not shown) presenting at least two portions provided with different density of said heating branches 23a (e.g. a first portion with high density and a second portion with low density of said heating branches). It can be pointed out that, under the same electrical current provided by the current generator, by varying the density of the heating branches of said electrically resistive circuit, i.e. the design thereof, a variation of the heating rate can be obtained.

As mentioned above, the thermally insulating layer 22 of the heating element 20 is provided so that the metallic substrate 21, i.e. the circumferential segments of the toroidal support, is thermally insulated.

Preferably, said thermally insulating layer 22 is made of a ceramic material. Preferably said ceramic material is selected in the group comprising: a mixture of Zirconium dioxide and Magnesium oxide ($ZrO_2$—$MgO$), Aluminum oxide ($Al_2O_3$), a mixture of Aluminum oxide and Titanium bioxide ($Al_2O_3$—$TiO_2$), a mixture of Zirconium dioxide and Titanium bioxide ($ZrO_2$—$TiO_2$).

Preferably, said thermally insulating layer 22 is applied by using a plasma-spray technique. According to said technique the material particles are applied by using a gas carrier which is ignited by means of an electric arc, i.e. a plasma of ionized gases is formed by making an inert gas (such as argon or nitrogen) to pass through a high energy electric arc. Said plasma is used to quickly and efficiently melt the material to be applied which, in the molten state, is then rapidly accelerated to the surface to be coated. The high temperatures which can be reached by using such a technique allow that materials having high melting points (e.g. ceramics) can be processed. Furthermore, said technique is very advantageous since very thin layers can be produced.

Preferably, the thickness of said thermally insulating layer 22 is comprised between 0.02 mm and 1 mm.

Among the features of the electrically resistive circuit 23, particular care has to be paid to the material to be used as well as to the thickness and the design of the electrically resistive circuit.

With regard to the material, it can be pointed out that the electrically resistive circuit 23 needs to be made of an electrically conductive material so that it can be heated by the flowing of an electrical current therein. Preferably, said electrically resistive circuit is made of a metal or a metal alloy. Preferably, said material is chosen in the group comprising copper, tungsten, aluminum alloy. Preferably, said material is chosen to have an electrical resistivity in the range from $1.7 \times 10^{-6} \Omega \times cm$ to $1.1 \times 10^{-4} \Omega \times cm$.

With regard to the thickness, it can be pointed out that the electrically resistive circuit needs to be as thin as possible in order to maximize the heating rate to be produced. Meanwhile, it is also necessary that the electrically resistive circuit is thick enough to be mechanically resistant to the thermic cycles. Therefore, a compromise between said two different requirements has to be reached. Preferably, the thickness of said electrically resistive circuit 23 is comprised between 0.01 mm and 0.5 mm.

With regard to the design, as mentioned above, the electrically resistive circuit can present a very high density of narrow heating branches 23a or a limited density of wide heating branches 23a. In the first case the resistivity of the electrical circuit increases and thus it is possible to operate at lower values of electrical current intensity; on the contrary, in the second case the electrically resistive circuit can be easily provided to the circumferential segment of the toroidal support, i.e. it is easier to be processed than the electrically resistive circuit of the first case.

Suitable electrical current conditions can be selected such as, for instance, direct current, alternate current, pulsanting current, waveform current (e.g. square wave).

In the case the same electrical current intensity is used, it can be pointed out that the best electrical performance, i.e. the highest heating rate, is obtainable when a very high density of narrow heating branches 23a is provided.

Preferably, the electrically resistive circuit is applied by using a plasma-spray technique.

According to a further embodiment of the present invention, the heating element 30 comprises a protective layer 24 (FIGS. 3 to 6) covering the electrically resistive circuit 23 and suitable for coming into contact with the inner circumferential surface of a green tyre to be manufactured on the outer surface of a toroidal support.

Preferably, said protective layer is particularly smooth so that the inner circumferential surface of the green tyre manufactured thereupon is as uniform and regular as possible.

Furthermore, said protective layer needs to be suitably thin in order to efficiently transfer the heat amount produced by the electrically resistive circuit towards the outer surface of the toroidal support and thus towards the inner circumferential surface of the green tyre.

Preferably, said protective layer is made of a ceramic material. Preferably, said ceramic material is applied by using a plasma-spray technique.

According to a further embodiment, the protective layer is a coating made of Teflon® which advantageously presents antiadherent, autolubricant and corrosion resistance properties.

According to a further embodiment, the protective layer comprises, in a radial direction from the inside towards the outside thereof, a first layer made of a ceramic material and a second layer made of Teflon®.

Moreover, the ends of the electrically resistive circuit 23, coated with the protective layer 24, are provided with respective slabs made of the same material of the electrically resistive circuit, said slabs having the function of allowing a simple and quick electrical connection of the heating element with the current generator or with adjacent heating elements.

According to an embodiment of the present invention, each circumferential segment is electrically connected with the adjacent ones so that only two of said segments are directly electrically connected with a current generator. The mutual electrical connection of said segments can be obtained, for instance, by providing the heating element with connecting pins preferably located in correspondence of the slabs present at the ends of the electrically resistive circuit.

According to a further embodiment of the present invention, each circumferential segment is electrically connected to an electrical circuit positioned within the toroidal cavity of the toroidal support. For example, a coupling element (e.g. a screw), made of the same material of the resistive circuit, is associated with the slabs present at the ends of the electrically resistive circuit of each circumferential segment and is electrically connected (e.g. by fixing an electrical cable to said screw) to said electrical circuit fed by the current generator.

Preferably, said electrical circuit is detachable from the toroidal support, e.g. by means of an automatic device (such as a robotized arm), before the introduction of said support within the moulding cavity.

In order to obtain a toroidal support, for manufacturing a green tyre thereupon, comprising a plurality of circumferential segments which are provided with a heating element, comprising, in a radial direction from the inside towards the outside of said heating element, a protective layer, a thermally insulating layer and an electrically resistive circuit in accordance with the present invention, a plurality of production techniques can be used.

Figure 3:
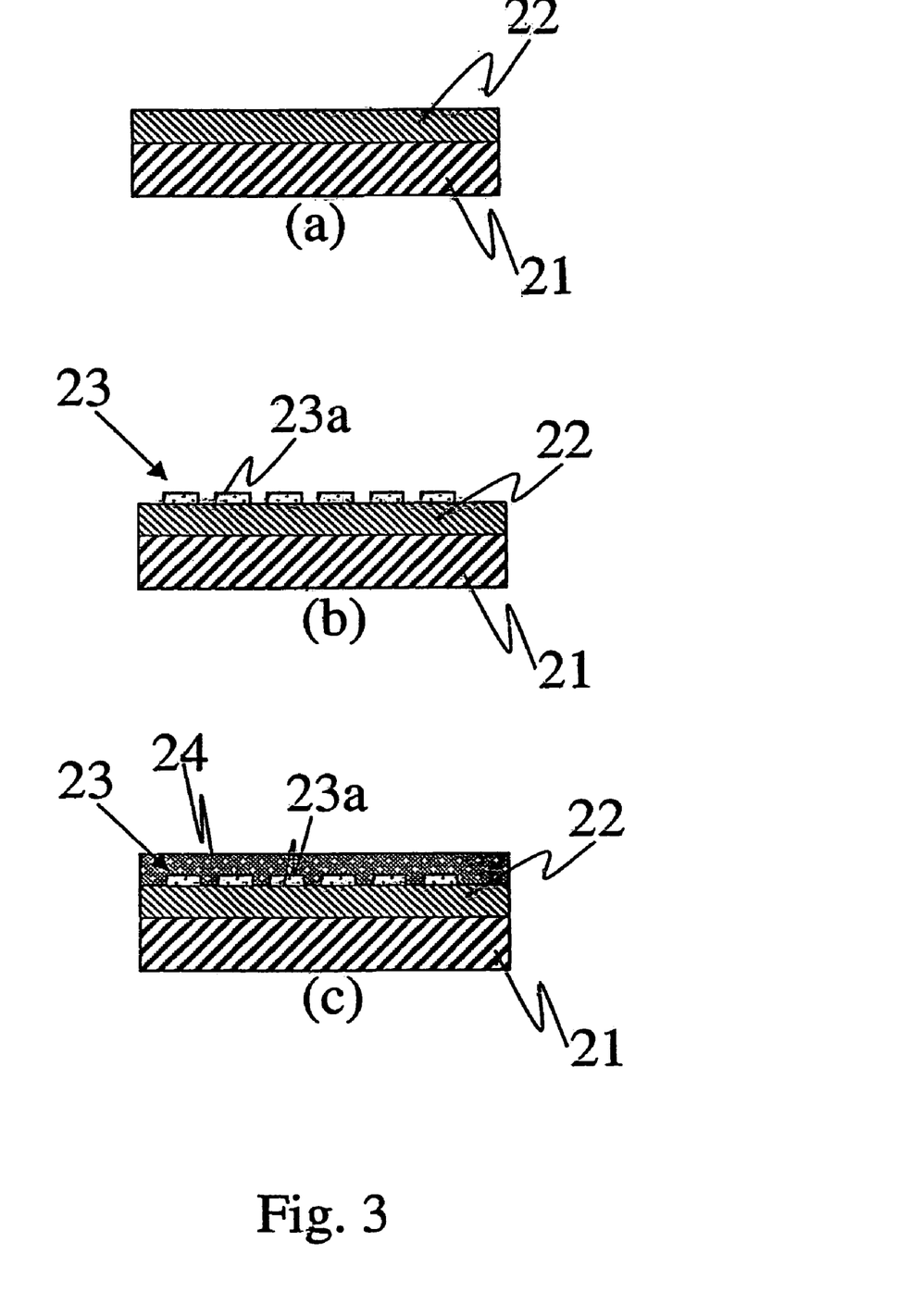
FIGS. 3 to 6 show the steps of different methods for providing the circumferential segments of a toroidal support with a heating element in accordance with the present invention.

FIG. 3 shows the main steps (a)-(c) of a production method of a circumferential segment of a toroidal support according to the invention.

According to said method a thermally insulating layer 22 is applied (step (a)) over the outer surface of the substrate 21, i.e. of the circumferential segment of the toroidal support.

Subsequently (step (b)), an electrically resistive circuit 23 is formed over the thermally insulating layer 22 by using the plasma-spray technique.

A plasma-spray technique is advantageously used for he following reasons. First of all, since the electrical resistance of a plasma-sprayed metal is higher than that of a laminated metal of the same thickness (because of the presence of voids in the metal applied by the plasma-spray technique), the electrical resistance of the electrically resistive circuit 23 obtained with such a production method is, under the same thickness of said circuit, higher than that of a circuit obtained from a lamination technique. Furthermore, the plasma-spray technique allows to obtain very thin (even of about 10 μm), and thus highly resistive, conductive layers. Very thin electrically resistive circuits allow to reduce the thickness of the protective layers, fact which favourably enhances the heating rate provided at the outer surface of the toroidal support. Furthermore, the plasma-spray technique allows that pure metal particles (e.g. copper or tungsten) can be mixed with an electrically resistive material (e.g. a ceramic material) so as to increase the electrical resistance of the circuit.

Coming back to the method described with reference to FIG. 3, in order to obtain said eletrically resistive circuit, a mask is placed over the thermally insulating layer, said mask reproducing the desired electrically resistive circuit to be obtained, so that at the end of the plasma-spraying process of the electrically resistive material the mask is removed and said circuit 23 is formed.

Subsequently (step c)), the protective layer 24 is finally applied over the electrically resistive circuit 23 as described above.

According to a further embodiment of the production method described with reference to FIG. 3, instead of using a mask and plasma-spraying the material of the electrically resistive circuit over the thermally insulating layer covered with said mask, the design of said circuit is performed by a gun whose movements are controlled by a computer so that a precise production of the heating branches of said circuit can be carried out.

Figure 4:
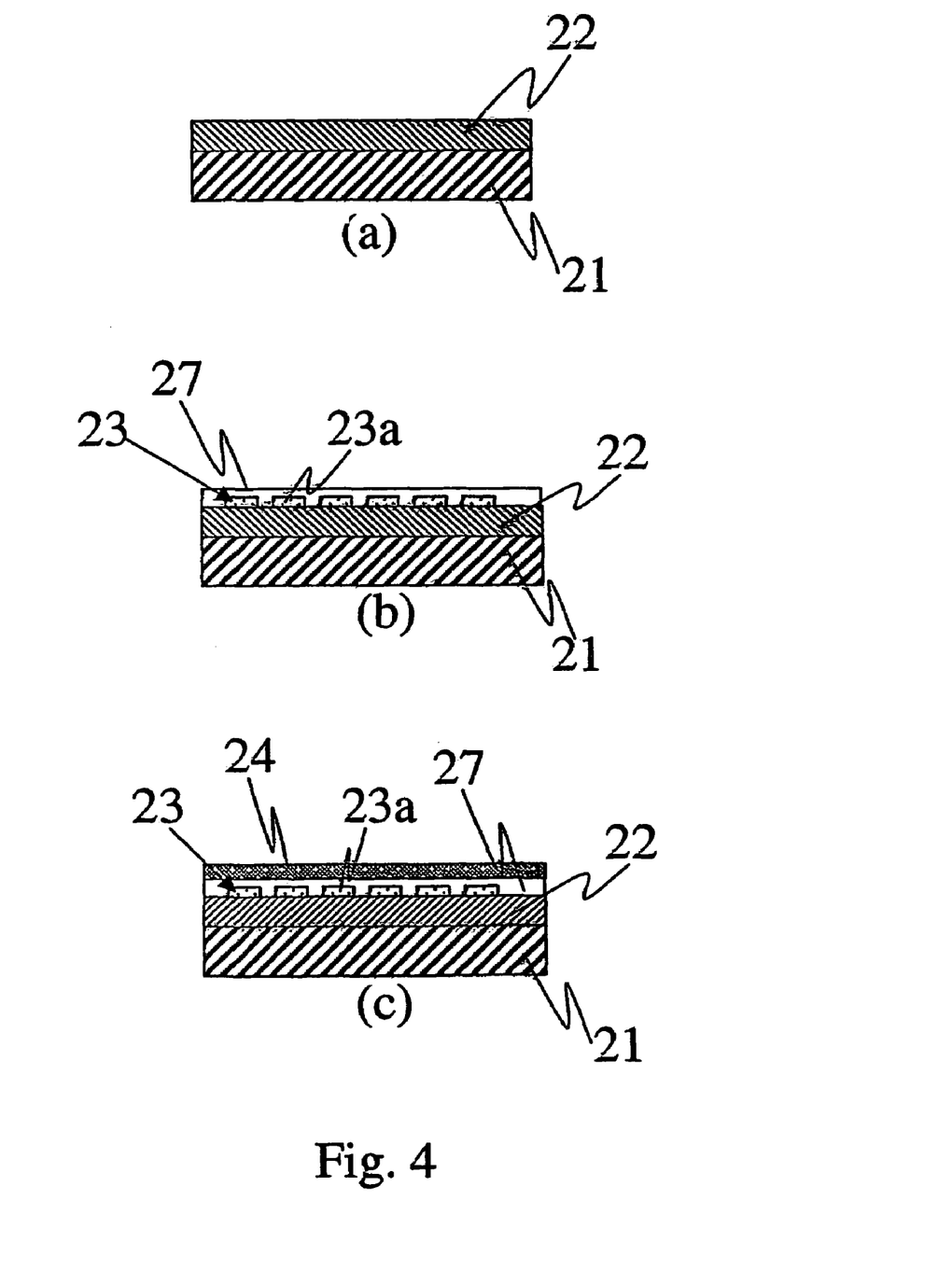

FIG. 4 shows the main steps (a)-(c) of a further production method of a circumferential segment of a toroidal support according to the invention.

According to said method a thermally insulating layer 22 is applied (step (a)) over the outer surface of the substrate 21, i.e. of the circumferential segment of the toroidal support.

Subsequently (step (b)), an electrically resistive circuit, provided with the heating branches 23a and previously produced in the form of a sheet, is associated to the thermally insulating layer 22. The electrically resistive circuit is prepared by starting from a sheet (for instance of about 50 μm in thickness) which undergoes a so-called chemical etching in order to obtain the desired thickness and refinement degree.

Subsequently (step c)), said electrically resistive circuit 23 is coated with a protective layer consisting of two different layers. In details, the first protective layer 27 is a thermally insulating layer which is very thin in corrispondence of the electrically resistive circuit 23. Said first protective layer can be made of the same material of the thermally insulating layer 22 or can be made of a different material, for instance of a different ceramic material.

Subsequently (step d)), the second protective layer 24 is finally applied as described above with reference to FIG. 4.

Figure 5:
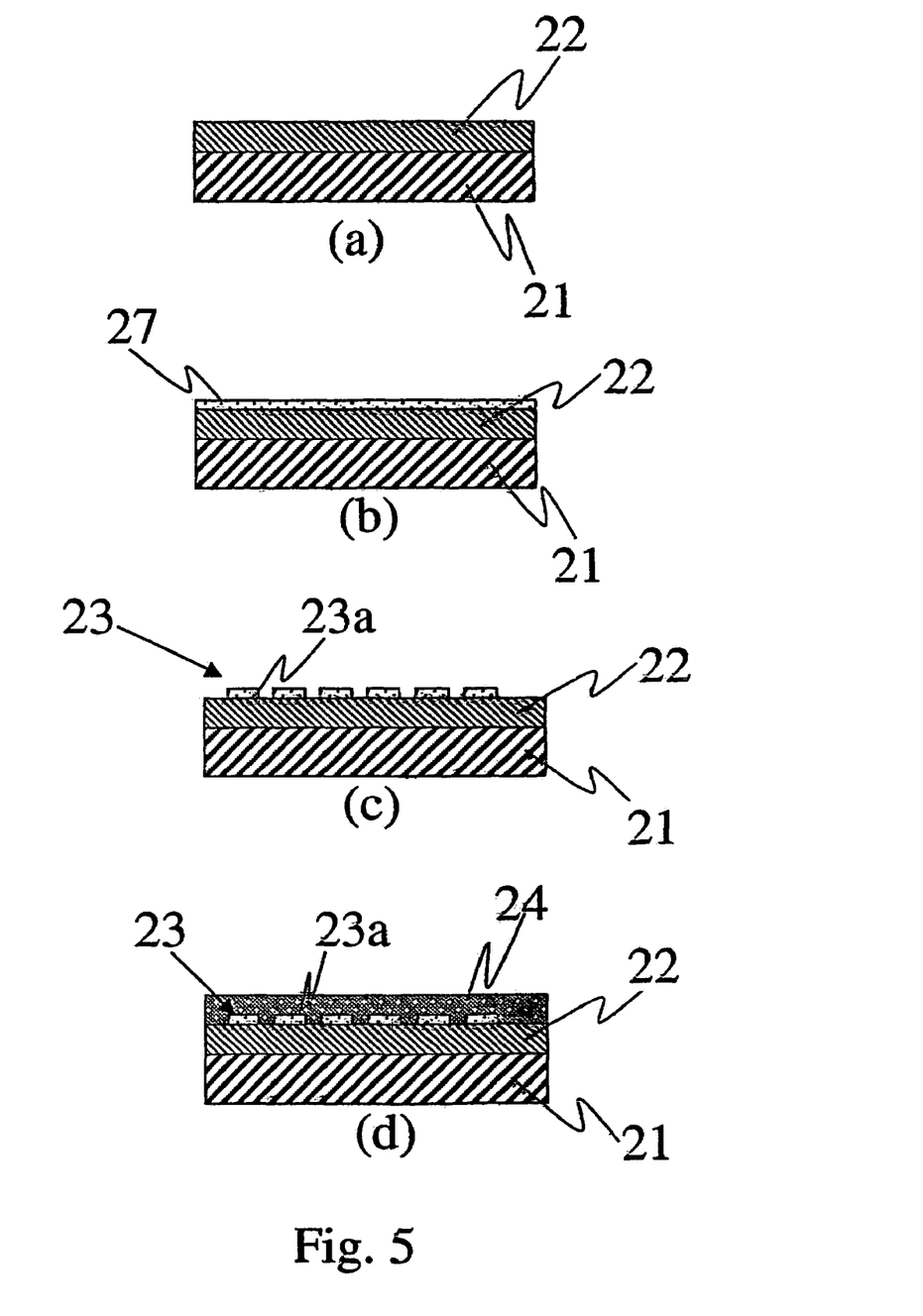

FIG. 5 shows the main steps (a)-(d) of a further production method of a circumferential segment of a toroidal support according to the invention.

According to said method a thermally insulating layer 22 is applied (step (a)) over the outer surface of the substrate 21, i.e. of the circumferential segment of the toroidal support.

Subsequently (step (b)), a layer 27 made of electrically resistive material is formed over the thermally insulating layer 22, said layer 27 being subsequently cut (step (c)) to obtain the desired profile of the resistive circuit 23 provided with the heating branches 23a.

Subsequently (step d)), the protective layer 24 is applied as described above.

Figure 6:
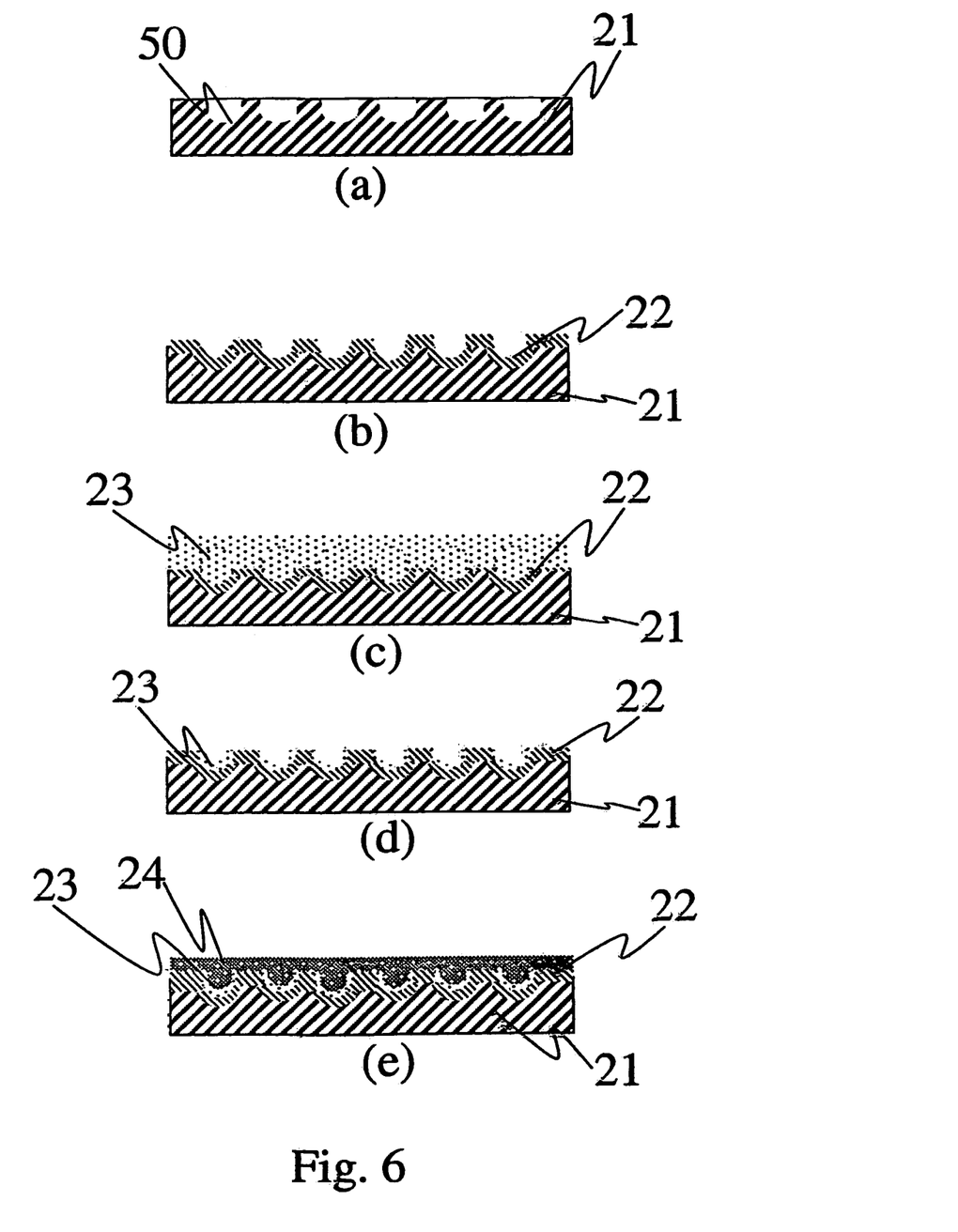

FIG. 6 shows the main steps (a)-(e) of a further production method of a circumferential segment of a toroidal support according to the invention. According to said method the outer surface of the substrate 21, i.e. of the circumferential segment, is previously cut (step (a)) in order to obtain a desired profile 50 suitable for embedding the electrically resistive circuit 23. In the right cross section, the shape of said profile 50 is preferably semi-oval or semi-circular) alternatively it can be rectangular.

Subsequently (step (b)), the thermally insulating layer 22 is applied within said profile 50. Preferably, said thermally insulating layer is applied by using a plasma-spray technique Subsequently (step (c)), the electrically resistive circuit 23 is applied over the thermally insulating layer 22.

Subsequently (step (d)), the outer surface of the heating element, obtained up to that point, is grinded so that the material of the electrically resistive circuit 23 is made to be contained within said profile 50 so that the heating branches of said circuit are obtained.

Subsequently (step (e)), the protective layer 24 is applied as described above.

For further description of the invention, some illustrative examples are given below.

EXAMPLE 1

An aluminum plate, having dimensions of 110 mm×100 mm×10 mm, was provided with a heating-element according to the invention by using the production method previously described with reference to FIG. 3.

Said aluminum plate, i.e. the metallic substrate, was provided with a first thermally insulating layer 22 made of the ceramic material $ZrO_2$—$MgO$ and applied by plasma-spraying. Said first thermally insulating layer was provided with an interlayer (not shown in the figures), i.e. a layer of $ZrO_2$—$MgO$ mixed with metal (in said case Aluminum) so that a concentration gradient of said metal is provided at the interface between the metallic plate and the thermally insulating layer (i.e. the ceramic layer) in order to increase the thermal compatibility between said metallic plate and said thermally insulating layer. Said first thermally insulating layer, of about 250 μm in thickness, was electrically tested by using a Unilap MIC160 equipment and an electrical resistane of about 30·GΩ was measured, said value showing that said layer was highly electrically resistive and thus insulating.

Subsequently, an electrically resistive circuit, previously produced from a thin sheet, as well as a protective layer were provided.

The dimensions of said electrically resistive circuit were of 109 mm in width and 90 mm in height and comprised 37 vertical heating branches 23a having a width of 1.8 mm and being spaced from each other of about 1 mm. Three different resistive circuits were provided according to the design mentioned above: a) a resistive circuit made of copper (copper density equal to 2.7 g/cm³; copper electrical resitivity equal to $2.8 \times 10^{-6}$ Ω×cm; copper specific heat equal to 0.88 J/(g/K)), having a thickness of about 100 μm and a weight of about 5.37 g; b) a resistive circuit made of copper, having a thickness of about 50 μm and a weight of about 2.56 g; c) a resistive circuit made of brass (brass density equal to 8.55 g/cm³; brass electrical resitivity equal to $6 \times 10^{-6}$ Ω×cm; brass specific heat equal to 0.38 J/(g/K)), having a thickness of about 30 μm and a weight of about 1.34 g.

Subsequently, a protective layer made of Clear Silicon (produced by RS) was applied by spraying to cover the resistive circuit. Said protective layer had a thickness lower than about 100 μm.

Subsequently, for each of the three heating elements mentioned above (indicated with A, B, C in Table 1 hereinbelow) the energy amount absorbed by the electrical resistive circuit was calculated (considering a direct electrical current of 5.3 A and 24 V) for heating the outer surface of the aluminum plate, provided with the heating element, from a temperature of 20° C. to a temperature of 140° C. The obtained values of energy amount corresponding to said heating elements A-C were compared with the energy amount absorbed by the aluminum plate for heating the outer surface thereof (i.e. not provided with the heating element according to the invention) from a temperature of 20° C. to a temperature of 140° C. (aluminum density equal to 8.93 g/cm³; aluminum electrical resitivity equal to $1.75 \times 10^{-6}$ Ω×cm; aluminum specific heat equal to 0.39 J/(g/K)).

TABLE 1

| Heating element | Energy amount (kJ) |
| --- | --- |
| A | 0.24 |
| B | 0.12 |
| C | 0.06 |
| Aluminum plate | 28.5 |

The data reported in Table 1 show that a remarkable energy saving can be obtained by providing the toroidal support with the heating system according to the present invention when compared with traditional heating of the whole body of the toroidal support.

Figure 7:
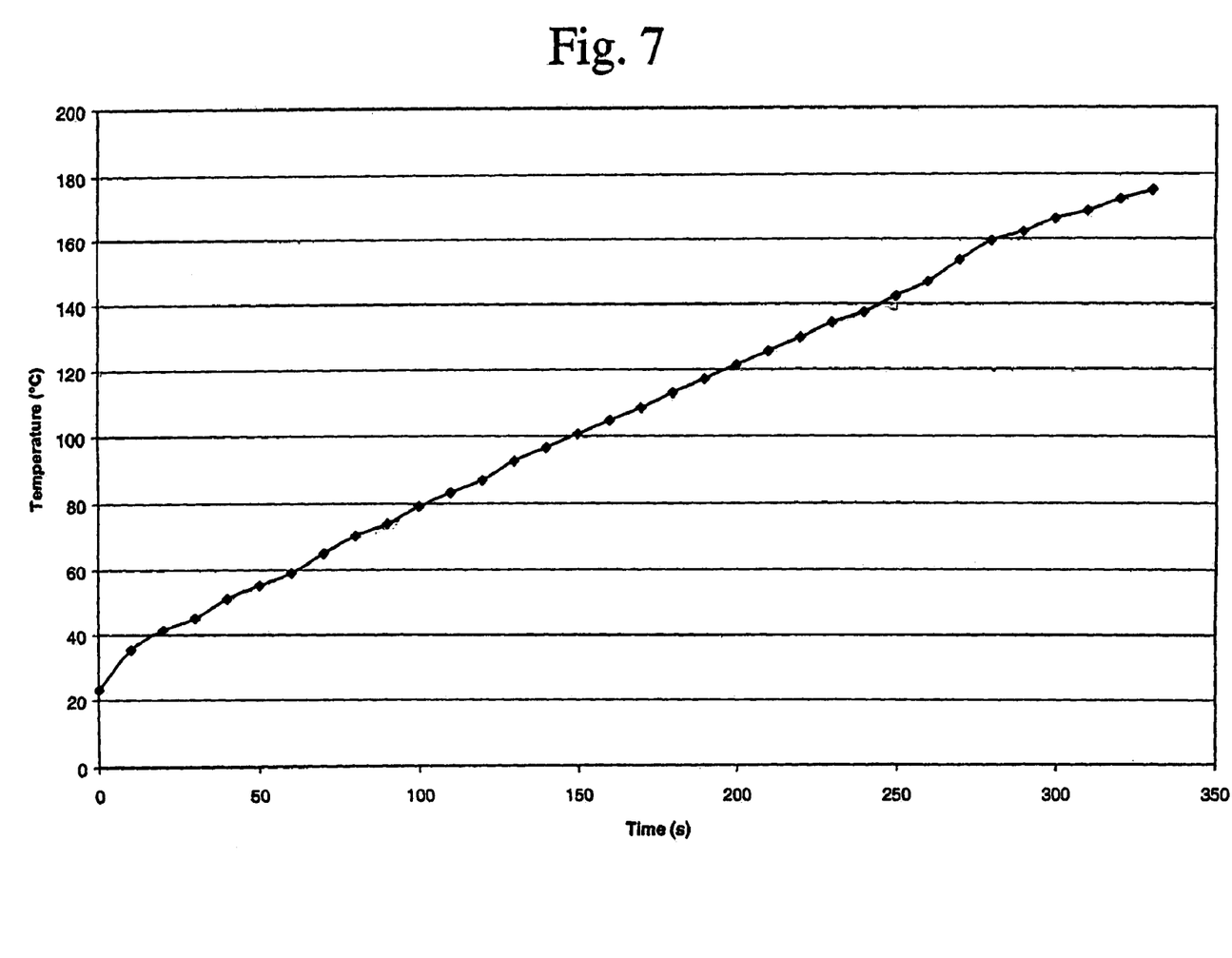
FIG. 7 shows a graphic representation of the temperature increase vs. time for a heating element according to the invention.

Furthermore, FIG. 7 shows that, by electrically connecting a current generator (5.3 A and 24 V) to the heating element C, the outer surface of the metallic support (aluminum plate) reaches a temperature of 166° C. (starting from a room temperature of 23.2° C.) in about 5 minutes, i.e. in a very short period of time, while the heating elements A and B require a period of time which is nearly twice than C.

EXAMPLE 2

Five samples were obtained (as indicated in Table 2 hereinbelow) by applying 5 different heating elements to an aluminum plate having dimensions of 100 mm×100 mm×10 mm.

TABLE 2

| Sample | Production method | Thermally insulating layer | Resistive circuit | Protective layer (monolayer) |
|---|---|---|---|---|
| 1 | According to FIG. 4 | made of $ZrO_2$—MgO Thickness 250 µm | made of brass Thickness 30 µm | made of silicon Thickness 50 µm |
| 2 | According to FIG. 3 | made of $ZrO_2$—MgO Thickness 250 µm | made of tungsten mixed with $ZrO_2$—MgO Thickness 100 µm | made of $ZrO_2$—MgO Thickness 50 µm |
| 3 | According to FIG. 6 | made of $ZrO_2$—MgO Thickness 250 µm | made of copper Thickness 100 µm | made of $ZrO_2$—MgO Thickness 50 µm |
| 4 | According to FIG. 6 | made of $ZrO_2$—MgO Thickness 250 µm | made of tungsten Thickness 100 µm | made of $ZrO_2$—MgO Thickness 50 µm |
| 5 | According to FIG. 5 | made of $ZrO_2$—MgO Thickness 250 µm | made of copper Thickness 100 µm | made of $ZrO_2$—MgO Thickness 50 µm |

The thickness of the thermally insulating layer indicated in Table 2 is a total thickness, i.e. it includes the thickness of the interlayer.

The dimensions of the electrically resistive circuit were the same for all the samples (as described in Example 1) except for sample 2 which presented a very simple circuit design comprising only 5 vertical heating branches 23a having a width of about 18 mm and being spaced from each other of about 4 mm.

Said samples 1-5 were firstly subjected to three thermal cycles by heating them up to 200° C. by introducing them into an air oven. All the samples successfully passed the test remaining undamaged.

Subsequently, said samples were connected to a current generator and the following measurement were carried out as indicated in Tables 3 and 4.

TABLE 3

| Sample | Heating rate (° C./min) | Electrical resistance of the circuit (Ω) | Resistive circuit surface area (cm$^2$) | Power supplied by the generator (W) |
|---|---|---|---|---|
| 1 | 26.1 | 4.6 | 92 | 126 |
| 2 | 9.4 | 12 | 110 | 85 |
| 3 | 27.4 | 1.8 | 82 | 144 |
| 4 | 8.3 | 14.1 | 82 | 73 |
| 5 | 10.0 | 3.2 | 84 | 80 |

TABLE 4

| Sample | Normalized heating rate (° C./min)/(W/cm$^2$) | Surface area of the resistive circuit/ total surface area |
|---|---|---|
| 1 | 19.1 | 0.66 |
| 2 | 12.2 | 0.76 |
| 3 | 15.6 | 0.66 |
| 4 | 9.4 | 0.66 |
| 5 | 10.5 | 0.66 |

The term "Resistive circuit surface area" indicates the surface area of the sample within which the resistive circuit is contained.

The ratio "Surface area of the resistive circuit/total surface area" indicates the percentage of the resistive circuit surface area which is actually occupied by the resistive circuit.

The heating rate was measured by using a thermocouple contacting the outer surface of the heating element.

The normalized heating rate indicates the heating rate in respect of the power supplied by the generator (said power varies from sample to sample since it depends on the electrical resistance of the resistive circuit) and of the surface area of the resistive circuit. Therefore, the highest is the value of the normalized heating rate, the most efficient is the heating element in terms of heat amount transferred to the outer surface of the sample.

The value of the ratio between the surface area of the resistive circuit and the total surface area indicates how the obtained heat amount is distributed on the outer surface of the heating element. Therefore, the highest is the value of said ratio, the most uniform is the distribution of the obtained heat amount.

From the data shown in Tables 3 and 4 it can be pointed out that to the superior performance of sample 1 contributes the very low thickness of the outermost protective layer.

It can also be pointed out that sample 2, despite its very simple circuit design, produces remarkable results in terms of heating amount transferred to the outer surface of the sample.

EXAMPLE 3

The heating element C described in Example 1 was used to evaluate the precuring of a rubber sheet sample.

Said rubber sheet, having a thickness of 2 mm, was positioned to cover the heating element C and a weight of about 600 g was positioned onto said rubber sheet in order to ensure a good contact between the latter and the outer surface of the heating element.

An electrical current of 5.3 A and 24 V was made to flow into the electrically resistive circuit of the heating element until a thermocouple contacting said heating element reached a temperature of 200° C.

Subsequently, the rubber sheet was removed from the heating element and cooled down to the room temperature.

In order to evaluate if the precuring of the rubber sheet was occured, the latter and the green rubber sheet were subjected to ultimate tensile stress, ultimate elongation and stress at break at 100% elongation (CA1) testings according to Standard UNI ISO 9026. The results are summarized in Table 5.

TABLE 5

| Sample | Green rubber sheet | Rubber sheet after cooling |
|---|---|---|
| Ultimate tensile stress (MPa) | 0.03 | 0.1 |

TABLE 5-continued

| Sample | Green rubber sheet | Rubber sheet after cooling |
| --- | --- | --- |
| Ultimate elongation (%) | 800 | 472 |
| CA1 (MPa) | 0.23 | 0.30 |

As indicated in Table 5, the increasing of CA1 as well as the decreasing of the ultimate tensile stress and of the ultimate elongation indicate that the rubber sheet was precured.

Furthermore, the rubber sheet after cooling was longitudinally cut into two pieces, each having a thickness of 1 mm, so as to form a bottom rubber sheet (which contacted the heating element during the heating process) and a top rubber sheet (not in contact with the heating element during said heating process). The testings mentioned above were carried out on said two rubber sheets and the result are summerized in Table 6.

TABLE 6

| Sample | Bottom rubber sheet | Top rubber sheet |
| --- | --- | --- |
| Ultimate tensile stress (MPa) | 0.12 | 0.10 |
| Ultimate elongation (%) | 323 | 417 |

The data from Table 6 indicate that a gradient of curing was present in the rubber sheet and, in more details, that the bottom rubber sheet was more cured than the top rubber sheet.

The present invention presents a plurality of advantages.

First of all the toroidal support according to the present invention, being heated only in correspondence of its outer surface thanks to the heating element described above, allows that the whole body of the toroidal support has not to withstand repeated thermal cycles which inevitably subject the support material to thermal fatigue. Therefore, the life of the toroidal support is advantageously increased and, at the same time, a remarkable energy saving is obtained since the heating of the whole body of the toroidal support is remarkably reduced.

Furthermore, the toroidal support according to the present invention allows a very fast heating of the inner circumferential surface of the green tyre as well as a homogeneous heat distribution on the outer surface of the toroidal support since a very high surface area thereof is covered by the resistive circuit.

Furthermore, the heating element provided to the toroidal support allows, if necessary, a local distribution of the heat amount so that portions of the toroidal support can be differently heated from each other. Said aspect is particularly advantageous for instance in the case the heating element provided to the toroidal support is used not only for precuring the tyre liner, but also during the vulcanization step in combination with the traditional heat amount provided by the vulcanization fluid as well as through the walls of the moulding cavity. Generally, since the tyre to be vulcanized is positioned inside of the moulding cavity with its sidewalls substantially parallel to the base of the vulcanizer, the condensate that forms during the curing step accumulates in correspondence of the lower sidewall of the tyre so that said lower sidewall reaches a temperature, and thus a curing degree, lower than that of the upper sidewall. In order to avoid such a drawback, according to the present invention a locally heat distribution of the toroidal support can be carried out so that the lower sidewall can be heated more that the upper one.

Furthermore, the toroidal support according to the present invention is simple to be obtained, the heating element provided to the support being of reduced volume and rather easy to be repaired.

The invention claimed is:

1. A process for manufacturing a tyre, comprising:
providing an elastomeric layer on an outer surface of a rigid toroidal support;
manufacturing the tyre on the rigid toroidal support provided with the elastomeric layer, wherein the rigid toroidal support includes a plurality of circumferential segments defining an outer surface of the toroidal support;
introducing the tyre supported on the rigid toroidal support into a moulding cavity;
introducing a fluid under pressure into a space defined between the rigid toroidal support and an inner surface of the tyre in order to press an outer surface of the tyre against walls of the moulding cavity; and
curing the tyre;
wherein the outer surface of the rigid toroidal support comprises a shape substantially matching a shape of the inner surface of the tyre,
wherein the elastomeric layer forms an inner circumferential surface of the tyre,
wherein the walls of the moulding cavity comprise a shape that matches a shape of the outer surface of the tyre, and
wherein the process further comprises causing an electrical current to flow in at least one heating element provided to the outer surface of the rigid toroidal support so as to obtain at least partial precuring of the elastomeric layer, wherein the at least one heating element comprises, in a radial direction from an inside toward an outside of the at least one heating element, a thermally insulating layer and an electrically resistive circuit.

2. The process of claim 1, wherein causing the electrical current to flow in the at least one heating element is carried out before introducing the fluid under pressure.

3. The process of claim 1, wherein causing the electrical current to flow in the at least one heating element is carried out after providing the elastomeric layer on the outer surface of the rigid toroidal support.

4. The process of claim 1, wherein causing the electrical current to flow in the at least one heating element is carried out after manufacturing the tyre on the rigid toroidal support.

5. The process of claim 1, wherein causing the electrical current to flow in the at least one heating element is carried out before providing the elastomeric layer on the outer surface of the rigid toroidal support.

6. The process of claim 1, wherein causing the electrical current to flow in the at least one heating element is carried out during curing the tyre.

7. The process of claim 1, wherein at least a portion of the outer surface of the rigid toroidal support is selectively heated.

8. The process of claim 1, wherein the electrical current comprises direct current, alternate current, pulsating current, or waveform current.

9. The process of claim 1, wherein the intensity of the electrical current is controlled.

10. The process of claim 1, wherein the thermally insulating layer is obtained by using a plasma-spray technique.

11. The process of claim 1, wherein the electrically resistive circuit is obtained by using a plasma-spray technique.

12. A toroidal support for manufacturing a tyre, comprising:
a plurality of circumferential segments defining an outer surface of the toroidal support;
wherein the outer surface of the toroidal support comprises a shape substantially matching a shape of an inner surface of the tyre,
wherein the toroidal support further comprises at least one heating element covering at least a portion of the outer surface of the toroidal support, and
wherein the at least one heating element comprises, in a radial direction from an inside toward an outside of the at least one heating element, a thermally insulating layer and an electrically resistive circuit.

13. The toroidal support of claim 12, wherein the thermally insulating layer is made of ceramic material.

14. The toroidal support of claim 13, wherein the ceramic material is:
a mixture of zirconium dioxide and magnesium oxide ($ZrO_2$—MgO),
aluminum oxide ($Al_2O_3$),
a mixture of aluminum oxide and titanium dioxide ($Al_2O_3$—$TiO_2$), or
a mixture of zirconium dioxide and titanium dioxide ($ZrO_2$—$TiO_2$).

15. The toroidal support of claim 12, wherein the thermally insulating layer has a thickness greater than or equal to 0.02 mm and less than or equal to 1 mm.

16. The toroidal support of claim 12, wherein the electrically resistive circuit comprises a plurality of heating branches.

17. The toroidal support of claim 12, wherein the electrically resistive circuit is made of an electrically conductive material.

18. The toroidal support of claim 17, wherein the electrically conductive material is a metal or metal alloy.

19. The toroidal support of claim 17, wherein the electrically conductive material is copper, tungsten, or an aluminum alloy.

20. The toroidal support of claim 17, wherein the electrically conductive material has an electrical resistivity greater than or equal to $1.7 \times 10^{-6} \Omega \times cm$ and less than or equal to $1.1 \times 10^{-4} \Omega \times cm$.

21. The toroidal support of claim 12, wherein the electrically resistive circuit has a thickness greater than or equal to 0.01 mm and less than or equal to 0.5 mm.

22. The toroidal support of claim 12, wherein the at least one heating element further comprises a protective layer radially external to the electrically resistive circuit.

23. The toroidal support of claim 22, wherein the protective layer is made of ceramic material.

24. The toroidal support of claim 22, wherein the protective layer comprises at least two layers.

25. The toroidal support of claim 24, wherein one of the at least two layers is a thermally insulating layer.

26. The toroidal support of claim 12, wherein one or more of the circumferential segments is provided with the at least one heating element.

27. The toroidal support of claim 12, wherein at least one of the circumferential segments is provided with a heating element comprising at least two electrically resistive circuits.

28. The toroidal support of claim 27, wherein the at least two electrically resistive circuits are selectively heated.

29. The toroidal support of claim 27, wherein the at least two electrically resistive circuits comprise different geometrical configurations.

30. The toroidal support of claim 27, wherein the at least two electrically resistive circuits comprise heating branches with different densities of the heating branches.

31. The toroidal support of claim 12, wherein the electrically resistive circuit comprises heating branches with different densities of the heating branches.

32. A toroidal support for manufacturing a tyre, comprising:
a plurality of circumferential segments defining an outer surface of the toroidal support; and
at least one heating element covering at least a portion of the outer surface of the toroidal support, the at least one heating element including at least one electrically resistive circuit, and
wherein the outer surface of the toroidal support comprises a shape substantially matching a shape of an inner surface of the tyre, and
wherein the at least one electrically resistive circuit comprises a first portion and a second portion each having heating branches, the density of the heating branches in the first portion being different from the density of the heating branches in the second portion, wherein the at least one heating element further comprises a thermally insulating layer positioned radially inward of the heating branches of the first and second portions.

33. The toroidal support of claim 32, wherein:
the at least one electrically resistive circuit includes a first electrically resistive circuit and a second electrically resistive circuit,
the first portion of the at least one electrically resistive circuit is part of the first electrically resistive circuit, and
the second portion of the at least one electrically resistive circuit is part of the second electrically resistive circuit.

34. The toroidal support of claim 32, wherein the first portion and the second portion of the at least one electrically resistive circuit are part of a same one of the at least one electrically resistive circuit.

* * * * *

UNITED STATES PATENT AND TRADEMARK OFFICE
CERTIFICATE OF CORRECTION

| | | |
|---|---|---|
| PATENT NO. | : 7,691,217 B2 | Page 1 of 1 |
| APPLICATION NO. | : 10/515832 | |
| DATED | : April 6, 2010 | |
| INVENTOR(S) | : Misani et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 731 days.

Signed and Sealed this

Fourth Day of January, 2011

David J. Kappos
*Director of the United States Patent and Trademark Office*